United States Patent [19]

Koelle et al.

[11] Patent Number: 5,802,485
[45] Date of Patent: Sep. 1, 1998

[54] CONTROL DEVICE INCLUDING AN ELECTRICALLY PROGRAMMABLE MEMORY

[75] Inventors: Ulrich Koelle, Schwieberdingen; Helmut Randoll, Vaihingen; Volker Schaeferjohann, Grossbottwar, all of Germany

[73] Assignee: Robert Bosch GmbH, Stuttgart, Germany

[21] Appl. No.: 555,960

[22] Filed: Nov. 13, 1995

[30] Foreign Application Priority Data

Nov. 10, 1994 [DE] Germany ............... 44 40127.2

[51] Int. Cl.[6] .................... G06F 9/24; G05B 19/42
[52] U.S. Cl. ................ 701/29; 701/35; 701/102; 701/115; 395/182.21; 395/183.22; 395/430
[58] Field of Search .......... 364/423.098, 424.034, 364/424.038, 424.04, 431.04, 431.11, 431.12; 395/430, 493, 182.16, 182.21, 183.22

[56] References Cited

U.S. PATENT DOCUMENTS

| | | | |
|---|---|---|---|
| 4,751,633 | 6/1988 | Henn et al. | 395/182.16 |
| 5,053,990 | 10/1991 | Kreifels et al. | 395/430 |
| 5,252,812 | 10/1993 | Nakamura | 235/380 |
| 5,278,759 | 1/1994 | Berra et al. | 364/423.98 |
| 5,351,185 | 9/1994 | Takeuchi et al. | 364/424.55 |
| 5,444,664 | 8/1995 | Kuroda et al. | 365/226 |

FOREIGN PATENT DOCUMENTS 44 25388  1/1996  Germany.

OTHER PUBLICATIONS

Bosch Technical Instruction Manual, Motronic Combined Ignitium and Gas–Injection System, 1983, (month is not available).

*Primary Examiner*—Tan Q. Nguyen
*Attorney, Agent, or Firm*—Kenyon & Kenyon

[57] ABSTRACT

A control device has a microcomputer, a memory which has a control program and can be cleared and programmed electrically, a read-only memory and a serial interface. In the read-only memory, a program for reprogramming the memory which can be cleared and programmed electrically is stored. For the reprogramming of the memory which can be cleared and programmed electrically, the control device receives the data to be programmed from an external communication device via the serial interface. The control device causes the program for reprogramming the memory which can be cleared and programmed electrically to be processed without the control program having to be started or operative for this purpose.

11 Claims, 3 Drawing Sheets

CONTROL DEVICE INCLUDING AN ELECTRICALLY PROGRAMMABLE MEMORY

BACKGROUND INFORMATION

In order to achieve higher flexibility in the programming of control devices, in particular motor vehicle control devices, it has proven advantageous to use memory modules (so-called Flash EPROMs) which can be cleared and programmed electrically. These memory modules have considerable advantages such as high memory densities and the facility of programming in an application circuit and the possibility of electrically clearing entire memory blocks rapidly. Flash EPROMs are therefore increasingly being used in large-series control devices. The Flash EPROMs serve as program memories in which the actual control program for the control device is stored.

Additionally, the control devices usually have a read-only memory (ROM) in which some of the program parts necessary for the reset process, i.e. the program parts which are called up after the switch on process, possibly test the control device and subsequently give up control to the control program stored in the memory which can be cleared and programmed electrically, are contained. The program parts which permit reprogramming of the memory which can be cleared and programmed electrically are also stored in the read-only memory.

However, in the known control devices, these program parts are called up only if the control device detects during the processing of its single control program that an external communication device is connected to the serial interface and that the communication device wishes to communicate with the control device.

The problem arises that, in cases where the memory content in the memory which can be cleared and programmed electrically has an incorrect entry, the control program no longer functions properly and it is no longer at all possible to call up program parts to reprogram the memory which can be cleared and programmed electrically because the control program itself is no longer functioning properly. This case is of course extremely rare but it may arise if the entry into the clear routine for clearing the memory which can be cleared and programmed electrically is effected by means of a program sequence (EMC) which is disrupted by interference radiation, and then a partial clearing of the memory which can be cleared and programmed electrically is also carried out.

It is of course possible to prevent this by means of circuitry measures, but this means an additional high outlay on circuitry which is not justified in every case because of the extremely rare occurrence of such faults. The fault situation is also counteracted to a large degree by software measures. However, without hardware protection, there is always a residual risk of "self destruction" of the program memory. Furthermore, there is the possibility of a badly programmed memory cell losing its contents after a specific time (data retention).

In the case described, subsequent reprogramming of the memory which can be cleared and programmed electrically would no longer be possible and, in the worst case, the control device would have to be scrapped.

Unpublished German Patent Application No. DE 44 25 388 A1 describes that, in order to solve this problem, apart from the means which permit the program for reprogramming the memory which can be cleared and programmed electrically to be initiated under the control of the control program, further means can be provided which also permit the program for reprogramming the memory which can be cleared and programmed electrically to be initiated without the control of the control program. For this purpose, a specific input of the control device is interrogated in the reset program and the initiation of the program for reprogramming the memory which can be cleared and programmed electrically without the control of the actual control program is enabled only if a specific input signal is present at this input.

In the case of an engine control device, the specific input is for example the input for a full load switch. In order to program the control device, the gas pedal must be completely depressed in the workshop so that the full load switch is actuated. Only then is it possible to program the memory which can be cleared and programmed electrically without the control of the control program.

SUMMARY OF THE INVENTION

The control device according to the present invention has the advantage that the program for reprogramming the memory which can be cleared and programmed electrically can always be called up without the control of the control program in the Flash EPROM. The result is that, on the one hand, the programming complexity in relation to the control program is reduced and, on the other hand, a universal solution for the previously described problem is obtained, it being possible for the solution to be used in a large number of different types of control devices for motor vehicles, for example in engine control devices, in transmission control devices, and in brake control devices.

It is no longer necessary for a specific input, which is adjusted to a specific level value by the workshop personnel, to be interrogated for each control device in order to initiate the reprogramming. In the known solution, in each case different inputs would have to be interrogated for the different types of control devices for motor vehicles. The workshop personnel would have to consult tables for the different types of control devices for motor vehicles to discover how the reprogramming process has to be initiated in an emergency. This constitutes a large degree of logistical complexity for workshops. With the solution according to the present invention, it is sufficient for example to disconnect the battery of the vehicle in order to initiate emergency reprogramming of the motor vehicle control device, of whatever type.

It is particularly advantageous that a reset program is stored in the read-only memory of the control device and that an interrogation is provided in the reset program, which interrogation is tested for correctness by means of a programming enabling code, transmitted to the control device by an external communication device, before the control device permits reprogramming of the memory which can be cleared and programmed electrically. This constitutes an additional safeguard against inadvertent initiation of the program for reprogramming the memory which can be cleared and programmed electrically.

It is also advantageous that the reset program is provided with a program part with which it is possible to detect whether the power supply of the control device was interrupted before the reset program started, or not, and it is advantageous that the control device enables the program for reprogramming the memory which can be cleared and programmed electrically only if it detects that the power supply of the control device had been interrupted previously. This measure also provides an additional safeguard against inadvertent initiation of reprogramming. The power supply can be briefly interrupted in workshops by simply disconnecting the battery or by briefly pulling the control device out of the place where it is installed so that the enabling state for reprogramming can be brought about in a uniformly simple way for every type of control device for motor vehicles and in the event that a plurality of control devices are installed in a motor vehicle can be brought about simultaneously.

In an embodiment of the present invention, an interruption of the power supply can be detected using programming means. In this solution, no additional outlay on circuitry is required. In contrast, in another embodiment, an interruption in the power supply is detected using an additional circuit.

In yet another embodiment of the present invention, the memory requirement for the read-only memory can be reduced. By virtue of the fact that the clearing and programming routines are reloaded into a volatile memory by the external communication device, only the program part which permits data to be exchanged with the external communication device needs to be stored in the read-only memory. This reduces the costs for the ROM memory and provides additional safeguarding against EMC faults so that incorrect initiation of reprogramming is virtually excluded.

It is also advantageous that in the reset program a specific input of the engine control device, e.g. the speed of revolution input, is additionally tested to determine whether a specific signal is present, and that the reset program enables the program to reprogram the memory which can be cleared and programmed electrically only if this is not the case. This also provides an additional safeguard against undesired reprogramming. In other control devices, this is a signal which is essential for operation. In transmission control devices, this is for example the change from P to N.

DETAILED DESCRIPTION

Figure 1:
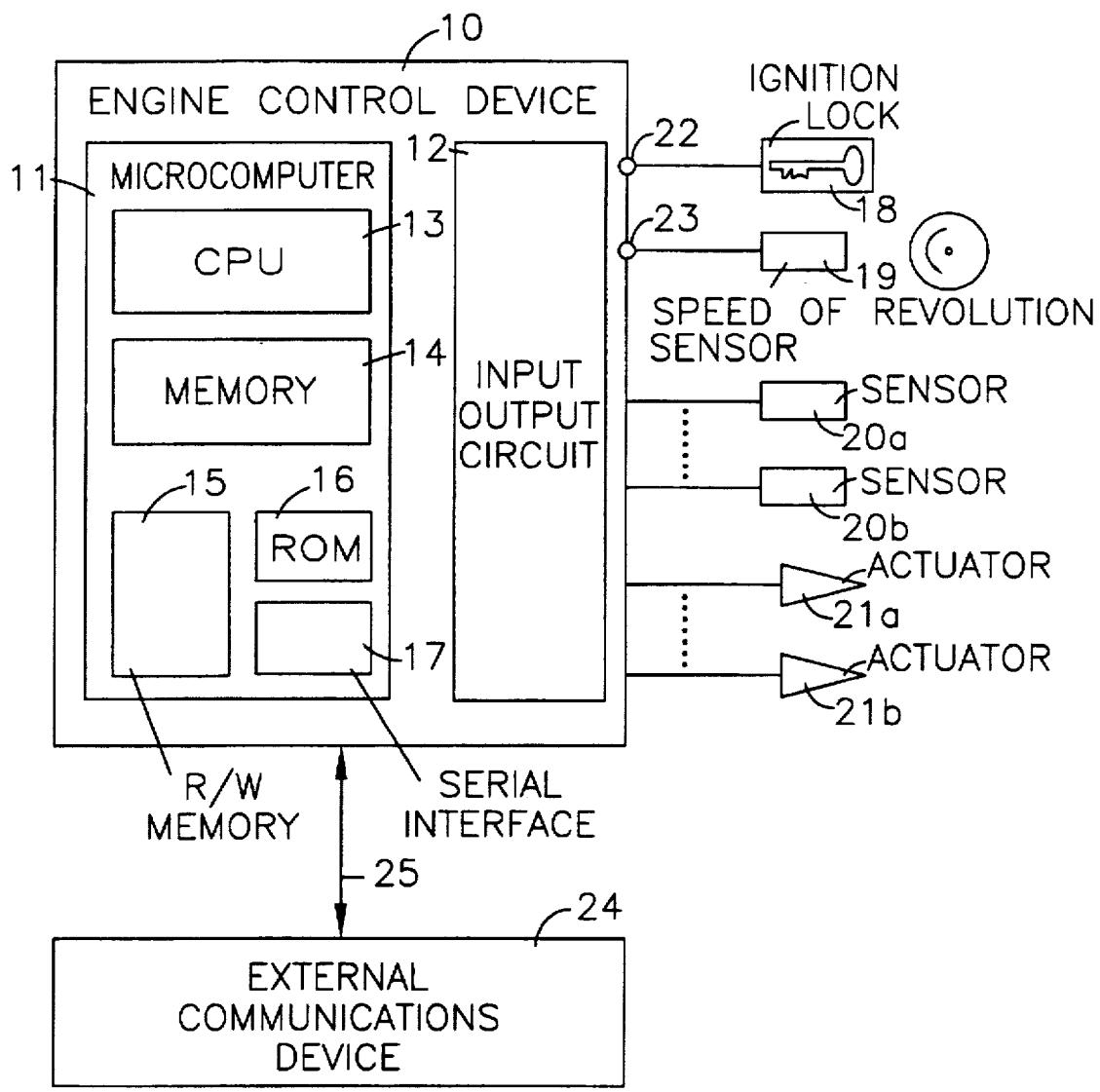
FIG. 1 shows a block circuit diagram of a first exemplary embodiment of the control device according to the present invention and an external communication device which is connected thereto.

The present invention is explained with reference to the example of an engine control device for controlling the internal combustion engine of a motor vehicle. In FIG. 1, 10 designates the engine control device. A microcomputer 11 is contained in the engine control device 10. The microcomputer is realized in this example as a single-chip microcomputer. The microcomputer 11 contains a CPU 13, a memory (Flash EPROM) 14 which can be cleared and programmed electrically, a read-write memory 15, a read-only memory 16 and a serial interface 17. An input/output circuit 12 is also provided in the engine control device.

A speed of revolution sensor 19 is connected to the engine control device 10. The speed of revolution sensor 19 is connected to the input 23 of the engine control device 10. The engine control device 10 is also connected to an ignition lock 18. The ignition lock 18 is connected to the input 22 of the engine control device 10. Further sensors 20A and 20B are connected to the engine control device but are not explained in greater detail individually. Depending on the engine control device, the sensors 20 may include, for example, an engine temperature sensor, an intake air temperature sensor, an airflow rate meter, an idling switch, etc. Actuators 21A and 21B are also connected to the engine control device 10. These include, for example, at least one injection valve and at least one ignition coil. Still further details of the engine control device 10 can be found, for example, in the publication "Bosch-Technische Unterrichtung", Kombiniertes Zund- und Benzineinspritzsystem Motronik ("Bosch Technical Instruction", Motronik combined ignition and petrol injection system), Robert Bosch GmbH, 1983.

An external communication device 24 is connected to the engine control 10 via a serial data transmission line 25. The connection to the external communication device 24 is provided for example for programming the memory 14 which can be cleared and programmed electrically and for diagnostic purposes. Both processes can be performed in a workshop of the corresponding motor vehicle manufacturer.

Here, the case is considered in which the driver of a vehicle has detected a fault in his engine control device and has subsequently gone to the nearest specialist workshop. If the vehicle was no longer in running order, a towing service would have to be used for this purpose. In the workshop, the engine control device 10 is then connected to the external communication device 24. The engine control device 10 is then tested, during which testing the contents of the memory 14 which can be cleared and programmed electrically are also checked. The actual diagnostic program of the engine control device can also be stored in such cases in the memory 14 which can be cleared and programmed electrically.

If a memory defect in the memory 14 which can be cleared and programmed electrically is detected during the test, the workshop personnel attempt to eliminate the fault in the control device by reprogramming the memory 14 which can be cleared and programmed electrically. The workshop personnel attempt to carry out reprogramming of the control device 10 even if the diagnostic program of the control device 10 was not processed correctly as a result of the defect in the memory 14 which can be cleared and programmed electrically. The emergency strategy is necessary for such a case. The number of returned goods is reduced for the manufacturer of control devices. The end customer saves on high repair costs (replacing control devices).

Figure 2:
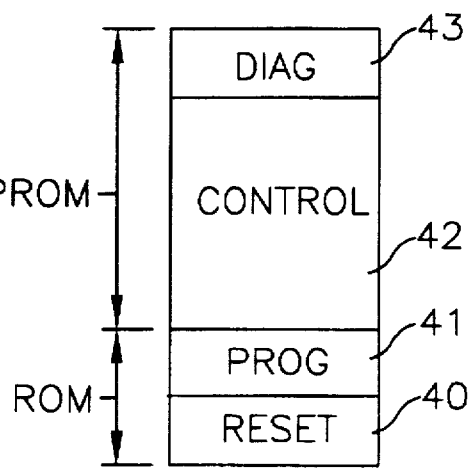
FIG. 2 shows a memory apportionment of the control device according to the present invention.

In FIG. 2, memory apportionment for the control device according to the present invention is illustrated. The memory area in which the reset program is stored is designated by the reference number 40. The reference number 41 designates the memory area in which the program for reprogramming the memory 14 which can be cleared and programmed electrically is stored. The two memory areas 40 and 41 are contained in the read-only memory (ROM). The reference number 42 designates the memory area in which the actual control program (Control) is stored. The reference number 43 designates the memory area in which the diagnostic program (Diag) is stored. These program parts are contained, as already mentioned, in the memory (Flash EPROM) which can be cleared and programmed electrically.

Figure 3:
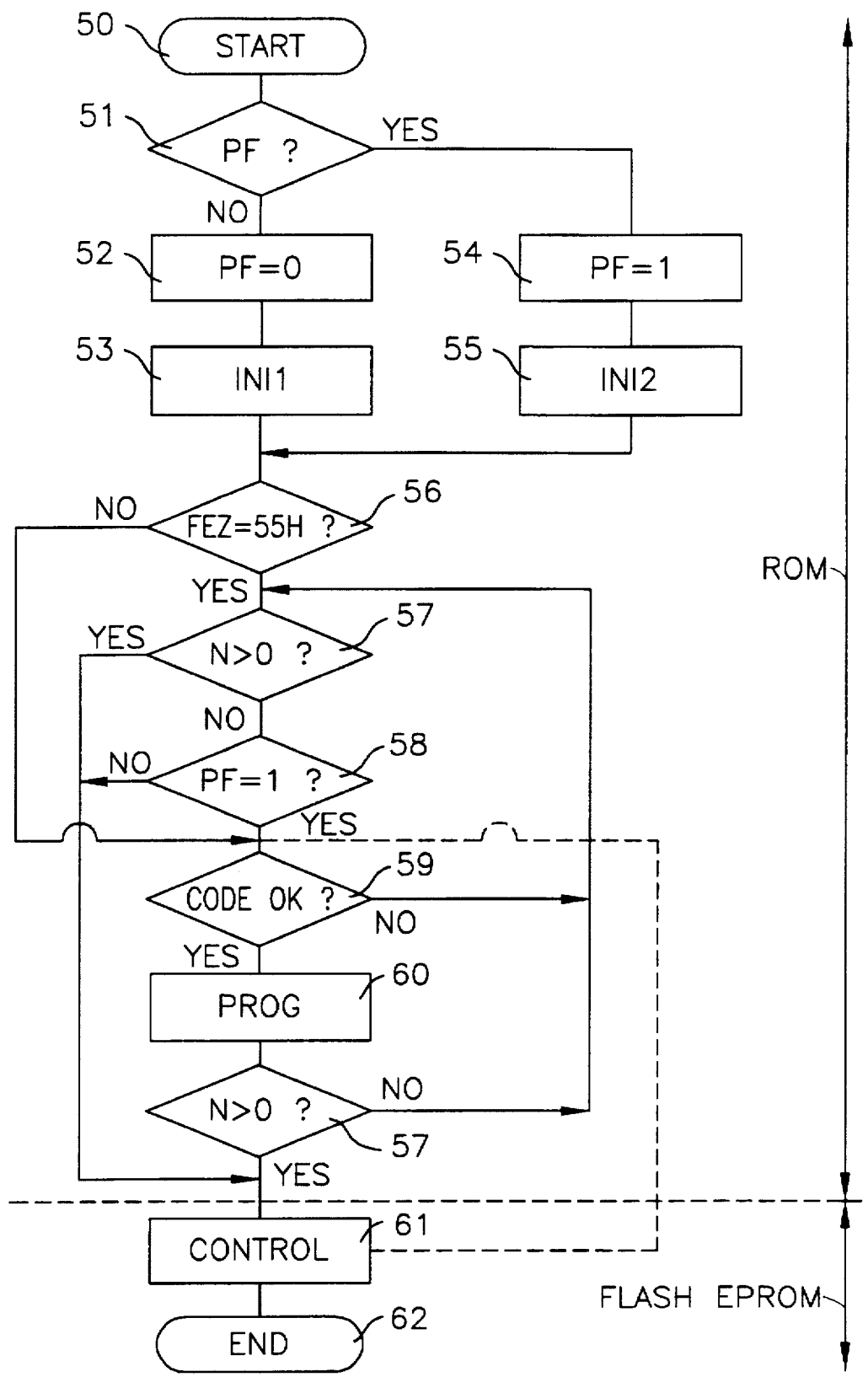
FIG. 3 shows a program structure for initiating the program for reprogramming the memory which can be cleared and programmed electrically in an engine control device according to the present invention.

The program sequence according to the present invention for initiating the program for reprogramming the memory 14 which can be cleared and programmed electrically is now explained with reference to FIG. 3. The reference number 50 designates the start of the program. The start of a program is triggered by turning the ignition key to the "ignition on" position. In this position of the ignition key, a reset pulse which resets the microcomputer 11 of the control device and, if appropriate, further components of the control device is briefly triggered by a circuit (not illustrated) of the control device. This causes the reset program of the microcomputer 11 to be processed.

After the start 50 of the reset program (Reset), in interrogation 51 it is tested whether the power supply of the control device 10 was interrupted before the start of the reset program or not (power fail). The engine control device 10 is in fact also supplied with power in the "ignition off" position of the ignition key. Although the microcomputer 11 is switched into a quiescent state in this case, the volatile memory 15 is supplied with power in this state so that its memory contents are not lost. The memory contents of the volatile memory 15 are lost only if the battery of the motor vehicle is disconnected for a brief time, for example 10 seconds.

In interrogation 51, a specific memory cell or a group of memory cells of the volatile memory 15 are now read out by the microcomputer 11 and compared with a specific pattern in the read-only memory 16. If the pattern corresponds to the read-out memory word, the power supply was not interrupted. If the power supply was not interrupted, a variable PF is set to the value zero in program step 52. The variable PF is entered into the volatile memory 15. Subsequently, in program step 53 the control device INI1 is then initialized. Since, in this case, the power supply of the control device was not interrupted, it is not necessary for the entire control device to be initialized.

In contrast, after an interruption of the power supply has been detected, the variable PF is set to the value 1 in the program step 54. Subsequently, a complete initialization INI2 of the control device takes place in program step 55. There are in fact adaptation values for a lambda control and knock control and similar adaptation values stored in the volatile memory 15, which values are lost after a interruption of the power supply. Replacement values for these must then be entered into the volatile memory 15 in program step 55. The replacement values constitute initial values for the adaptation and are obtained from the read-only memory 16.

In interrogation 56, the reset program (Reset) checks whether a specific memory cell FEZ in the memory which can be cleared and programmed electrically contains a specific value (for example the value 55 H). By means of this memory cell the reset program detects whether the memory 14 which can be cleared and programmed electrically is in the programmed state or whether it has already been cleared. This cell is the last to be programmed during the programming process. It thus indicates that the programming process is completely terminated. If it is detected in interrogation 56 that the memory which can be cleared and programmed electrically has already been cleared, the program is continued with interrogation 59. This interrogation is explained below in greater detail. Otherwise, the program is continued with step 57.

In step 57 it is tested whether a start request for the engine is present. For this, the microcomputer 11 reads out a memory location in the input/output circuit 12. This memory location is then always automatically incremented by means of a circuit when the speed of revolution sensor 19 outputs an angular mark signal. A start request is detected for example from the fact that when there is an instantaneous interrogation from the microcomputer 11, the entry in the memory location has changed in comparison with a previous interrogation of the memory location. This has the same significance as the interrogation to determine whether the speed of revolution N of the engine has a value greater than zero rpm.

If a start request has been detected in this way, the program jumps to the engine control program (Control) in the program step 61. If no start request is detected in interrogation 57, the program tests, by reading out the variable PF in interrogation 58, whether an interruption of the power supply has been detected previously in interrogation 51 or not. If it is detected in this interrogation that the entry 1 is present in the memory location for the variable PF, interrogation 59 is carried out as the next program step. Otherwise, the program jumps to the control program in program step 61 and carries out further initializations there if appropriate. Afterwards, the computer also waits for N>0 and then the driving program is executed. Interrogation 58 is then already part of the program (PROG) for reprogramming the memory 14 which can be cleared and programmed electrically.

In interrogation 59 the computer waits for a specific programming enabling code to be transmitted to the engine control device 10 from the external communication device 24. If the code is not transmitted, or is transmitted incorrectly, the program carries on again with interrogation 57. If the received code does not correspond to a code stored in the engine control device 10 or code calculated by the engine control device 10, the actual program (Prog) for reprogramming the memory 14 which can be cleared and programmed electrically is finally called up.

This program is processed in program step 60. The clearing and programming routines are known to the person skilled in the art so that greater details will not be given on this below. It is still significant that the microcomputer 11 also reads out the memory location in the input/output circuit 12 in a short time slot pattern during the processing of this program part (Prog) in order to be able to detect the start request, as in interrogation 57. If a start request is detected, the program (Prog) is aborted in order to reprogram the memory 14 which can be cleared and programmed electrically, and branching takes place to the engine control program (Control) in program step 61. After the programming of the memory 14 which can be cleared and programmed electrically is ended, the interrogation 57 takes place again. The program then waits for a start request to start the engine control program (Control).

When the ignition key is placed at the "ignition off" position in this program loop which is produced, the program is ended. If the engine is started, the program (Control) of the engine control device 10 is called up in program step 61 and processed up to the end in program step 62. The arrow consisting of broken lines in FIG. 3 indicates that a program part, from which the program for reprogramming the memory which can be cleared and programmed electrically can be called up, can also be stored in the Flash EPROM.

Figure 4:
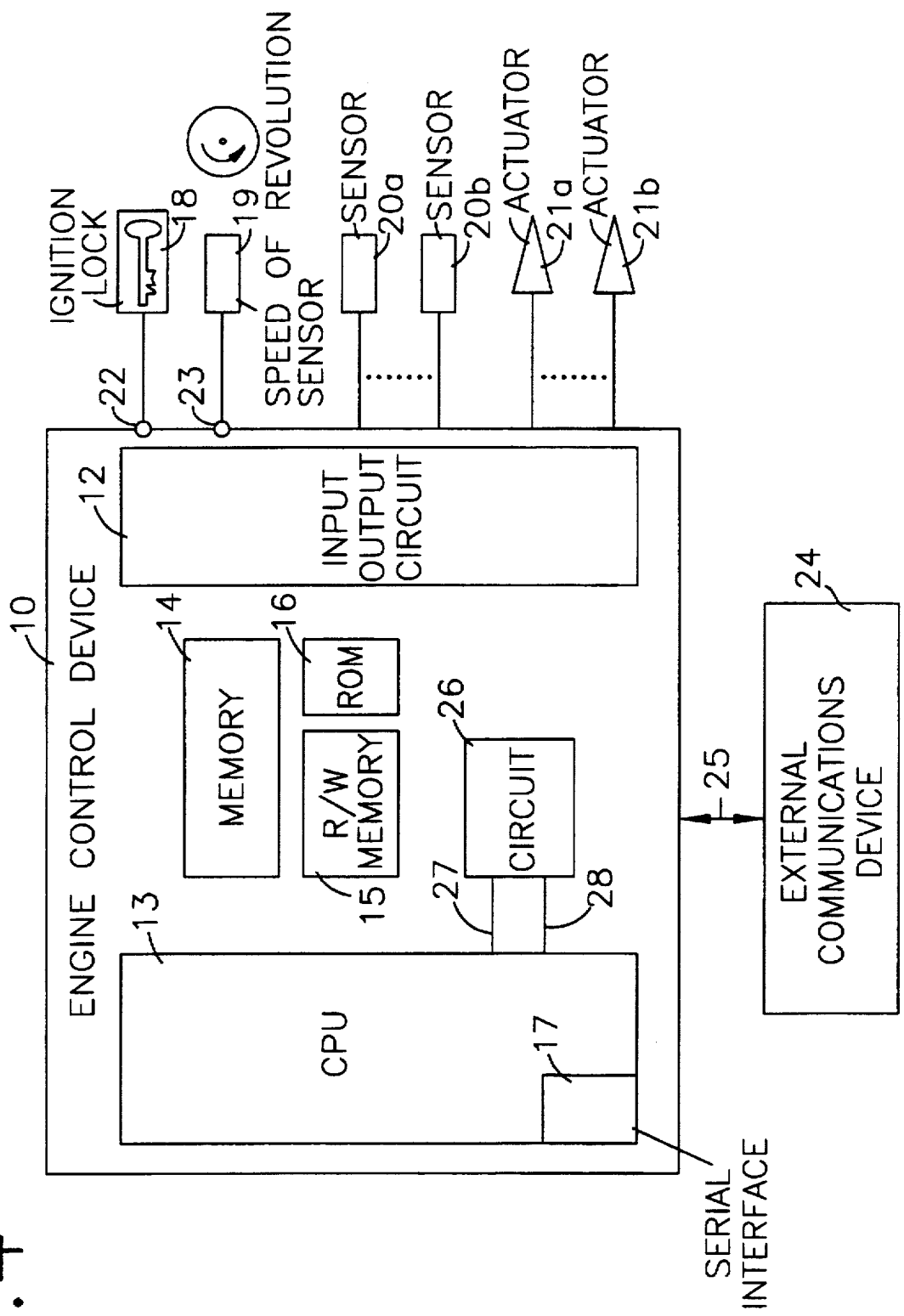
FIG. 4 shows a block circuit diagram of a second exemplary embodiment of the control device according to the present invention and an external communication device which is connected thereto.

In FIG. 4, a second exemplary embodiment of the present invention is illustrated. In FIG. 4, the same reference numerals designate the same parts as in FIG. 1. In contrast with FIG. 1, the microcomputer 11 is not realized as a single-chip computer in the second exemplary embodiment. In each case separate control elements for the CPU 13, the memory 14 which can be cleared and programmed electrically, the volatile memory 15 and the read-only memory 16 are contained in the control device 10. An additional voltage monitoring circuit 26 is connected to the CPU 13. The voltage monitoring circuit 26 contains a bistable circuit. When the power supply of the control device 10 is interrupted, the bistable circuit of the voltage monitoring circuit 26 goes into a defined switched state. This switched state does not change after the power supply is switched on either.

In interrogation 51 of the reset program, the CPU 13 then evaluates the switched state of the bistable circuit via the illustrated connection 27. Before the actual control program is called up in program step 61, the bistable circuit in the voltage monitoring circuit 26 is reset via the connection 28. Detection of an interruption in the power supply is therefore realized by means of circuitry measures. With this solution, the control device does not need to carry out a pattern comparison between a memory word in the volatile memory 15 and a pattern in the read-only memory 16.

The present invention is not limited to the exemplary embodiment described here. It can always be used appropriately if a control device contains a memory (Flash EPROM) which can be cleared and programmed electrically. An appropriate application involves only the program parts which permit communication with the external communication device 24 being stored in the read-only memory 16 instead of the complete program for reprogramming the memory 14 which can be cleared and programmed electrically. The actual clearing and programming routines can then be reloaded from the external communication device 24 into the volatile memory (RAM) and then started there.

Motor vehicle control devices frequently have standardized diagnostic interfaces. For such a case, the communication with the external communication device 24 can also take place via such a standardized diagnostic interface. If a plurality of motor vehicle control devices which are connected to one another via a serial bus connection are contained in a motor vehicle, a programming process of the motor vehicle control devices can be initiated simultaneously for all of the motor vehicle control devices by disconnecting the battery of the motor vehicle, the programming of the individual control devices then being separately executed in succession via the serial bus connection.

In this case, there does not necessarily have to be a defect in one of the control devices. The programming can also serve the purpose of adjusting the control device, for example adjusting an engine characteristic curve. Programming of the control devices at the end of the production line is also possible in the same way. This technique also has the objective of eliminating faults occurring in the field by programming new programs and data states in the workshop.

What is claimed is:

1. A control device for receiving program data from an external communication device through a serial interface, the control device comprising:

a central processing unit;

a programmable memory coupled to the central processing unit, the programmable memory storing a control program; and a read-only memory storing at least a portion of a reprogramming program for reprogramming the programmable memory, the read-only memory also storing a reset program, wherein the reset program determines whether power to the control device was interrupted before the reset program was started, and wherein the reprogramming program is started if it is determined that power to the control device was interrupted.

2. The control device according to claim 1, wherein the control device is an engine control device for controlling an internal combustion engine of a motor vehicle.

3. The control device according to claim 1, wherein:

the reset program is executed after start-up by switching on an ignition;

the central processing unit checks for correctness a programming enabling code received from the external communication device; and the reprogramming program is started only if the programming enabling code is correct.

4. A control device for receiving program data from an external communication device through a serial interface, the control device comprising:

a central processing unit;

an electrically erasable and programmable memory coupled to the central processing unit, the erasable and programmable memory storing a control program; and a read-only memory for storing at least a portion of a reprogramming program for reprogramming the erasable and programmable memory, the reprogramming program being executed regardless of whether the control program is started or operative;

wherein the read-only memory stores a reset program, the reset program being executed after start-up, by switching on an ignition, the central processing unit checks for correctness a programming enabling code received from the external communication device, the reprogramming program is started only if the programming enabling code is correct, the reset program determines whether power to the control device was interrupted before the reset program was started, and the reprogramming program is started if it is determined that power to the control device was interrupted.

5. The control device according to claim 4, further comprising a volatile memory, and wherein:

whether power to the control device was interrupted is determined by comparing at least one memory word stored in the volatile memory with at least one pattern stored in the read-only memory; and an interruption is deemed to have occurred if the at least one memory word does not correspond to the at least one pattern.

6. The control device according to claim 5, wherein:

the reprogramming program contains a first portion which permits an exchange of data with the external communication device; and the reprogramming program contains a second portion which is reloaded from the external communication device into the volatile memory, the second portion including a clearing and programming routine.

7. The control device according to claim 4, further comprising a voltage monitoring circuit, the circuit being in a preselected switched state if power to the control device was interrupted for more than a preselected time period, the reset program detecting the switched state of the circuit.

8. A control device for receiving program data from an external communication device through a serial interface, the control device comprising:

a central processing unit;

an electrically erasable and Programmable memory coupled to the central processing unit, the erasable and programmable memory storing a control program; and a read-only memory for storing at least a portion of a reprogramming program for reprogramming the erasable and programmable memory, the reprogramming program being executed regardless of whether the control program is started or operative;

wherein the read-only memory stores a reset program, the reset program being executed after start-up, by switching on an ignition, the central processing unit checks for correctness a programming enabling code received from the external communication device, the reprogramming program is started only if the programming enabling code is correct, the reset program checks a speed of revolution input of the control device to determine whether a speed of revolution signal is present, if the speed of revolution signal is not present, the reprogramming program is executed, and if the speed of revolution signal is present, the control program is executed.

9. A control device for receiving program data from an external communication device through a serial interface, the control device comprising:

a central processing unit;

a programmable memory coupled to the central processing unit, the programmable memory storing a control program; and a read-only memory storing at least a portion of a reprogramming program for reprogramming the programmable memory, and also storing a reset program;

wherein the reset program checks a speed of revolution input of the control device to determine whether a speed of revolution signal is present, if the speed of revolution signal is not present, the reprogramming program is executed, and if the speed of revolution signal is present, the control program is executed.

10. A control device for receiving program data from an external communication device through a serial interface, the control device comprising:

a central processing unit;

an electrically erasable and programmable memory coupled to the central processing unit, the erasable and programmable memory storing a control program; and a read-only memory for storing at least a portion of a reprogramming program for reprogramming the erasable and programmable memory, the reprogramming program being executed regardless of whether the control program is started or operative;

wherein the read-only memory stores a reset program, the reset program being executed after start-up, by switching on an ignition, the central processing unit checks for correctness a programming enabling code received from the external communication device, and the reprogramming program is started only if the programming enabling code is correct.

11. A control device for receiving program data from an external communication device through a serial interface, the control device comprising:

a central processing unit;

an electrically erasable and programmable memory coupled to the central processing unit, the erasable and programmable memory storing a control program; and a read-only memory for storing at least a portion of a reprogramming program for reprogramming the erasable and programmable memory, the reprogramming program being executed regardless of whether the control program is started or operative, the reprogramming program containing a first portion which permits an exchange of data with the external communication device, and the reprogramming program further containing a second portion which is reloaded from the external communication device into the volatile memory, the second portion including a clearing and programming routine;

wherein the read-only memory stores a reset program, the reset program being executed after start-up, by switching on an ignition, the central processing unit checks for correctness a programming enabling code received from the external communication device, and the reprogramming program is started only if the programming enabling code is correct.

* * * * *

UNITED STATES PATENT AND TRADEMARK OFFICE
CERTIFICATE OF CORRECTION

PATENT No. : 5,802,485

DATED : September 1, 1998

INVENTOR(S): Ulrich Koelle, Helmut Randoll, Volker Schaeferjohann

It is certified that error appears in the above-identified patent and that said Letters Patent is hereby corrected as shown below:

Column 4, line 7, "sensors 20" should be --sensors 20A and 20B--; and

Column 9, line 1, "Programmable" should be --programmable--.

Signed and Sealed this

Seventeenth Day of August, 1999

Attest:

Q. TODD DICKINSON

*Attesting Officer*      *Acting Commissioner of Patents and Trademarks*